United States Patent
Sugata

[11] Patent Number: 5,947,661
[45] Date of Patent: Sep. 7, 1999

[54] CUTTING CHIP AIR-STREAM REMOVING DEVICE FOR A MECHANICAL TOOL

[75] Inventor: Shinsuke Sugata, Hiroshima-ken, Japan

[73] Assignee: Horkos Corp., Hiroshima-ken, Japan

[21] Appl. No.: 08/676,179

[22] PCT Filed: Jan. 17, 1995

[86] PCT No.: PCT/JP95/00035

§ 371 Date: Jul. 15, 1996

§ 102(e) Date: Jul. 15, 1996

[87] PCT Pub. No.: WO95/19869

PCT Pub. Date: Jul. 27, 1995

[30] Foreign Application Priority Data

Jan. 19, 1994 [JP] Japan ................................. 6-032791
Oct. 22, 1994 [JP] Japan ................................. 6-295494

[51] Int. Cl.$^6$ ............................ B23Q 11/02; B23Q 11/10
[52] U.S. Cl. ........................... 409/131; 408/1 R; 408/58; 408/67; 409/136; 409/137
[58] Field of Search ................................. 409/131, 132, 409/135, 136, 137; 408/1 R, 56, 57, 58, 59, 67

[56] References Cited

U.S. PATENT DOCUMENTS

| | | | |
|---|---|---|---|
| 4,037,982 | 7/1977 | Clement | 408/67 |
| 4,209,069 | 6/1980 | Smith | 408/67 |
| 4,563,115 | 1/1986 | Abe et al. | 408/67 |
| 4,822,219 | 4/1989 | Wood et al. | 409/137 |
| 4,917,547 | 4/1990 | Fredrickson et al. | 409/136 |
| 4,951,578 | 8/1990 | Von Haas et al. | 409/137 |
| 5,199,830 | 4/1993 | Otani et al. | 409/137 |
| 5,356,245 | 10/1994 | Hosoi et al. | 408/67 |

FOREIGN PATENT DOCUMENTS

| | | | |
|---|---|---|---|
| 3734127 | 4/1989 | Germany | 409/137 |
| 61-120445 | 7/1986 | Japan . | |
| 64-16237 | 1/1989 | Japan . | |
| 4-83607 | 7/1992 | Japan . | |
| 115518 | 10/1992 | Japan . | |
| 5-21376 | 6/1993 | Japan . | |

*Primary Examiner*—Daniel W. Howell
*Attorney, Agent, or Firm*—Lane, Aitken & McGann

[57] ABSTRACT

An air-suction chip removing device for use in continuously removing chips produced by a cutting tool such as a drill when a work is processed by a machine tool to another place without inflicting any damage onto the work. This device is characterized in that a surrounding body (8) is provided around the proximal end of a cutting tool (7) mounted on a spindle (1), that a tubular member (14) adapted to surround the cutting tool (7) in such a manner as to be freely withdrawn, that this tubular member (14) is formed into a shape in which an opening (p) formed in the distal end of the cutting tool (7) is narrowed toward the center of the cutting tool (7) and is biassed toward the distal end of the cutting tool (7) by means of a spring (17), and that a suction pipe (9) is connected to the surrounding body (8) for sucking air from the inside of the tubular member (14).

16 Claims, 7 Drawing Sheets

CUTTING CHIP AIR-STREAM REMOVING DEVICE FOR A MECHANICAL TOOL

FIELD OF ART

The present invention relates to a cutting chip removing method and device for a machine tool, which can continuously remove, with an air stream, cutting chips generated during machining workpieces without any inconvenience of damaging workpieces.

BACKGROUND OF THE INVENTION

A machine tool in which the surrounding of a tool is enclosed by a cover and cutting chips generated by said tool during machining workpieces are able to be continuously sucked in and removed by sucking in air in said cover has been already disclosed (Refer to Japanese laid open utility model publication No. Hei-3-117518).

In this machine tool, the forward edge of said cover is brought into contact with the surface of a workpiece during machining, and there are cases where said cover is caught by staged parts on the surface of a workpiece, whereby a workpiece can not be machined while moving said tool along the surface thereof, and the surface of a workpiece may be damaged by said cover being brought into contact with the surface of a workpiece.

Furthermore, when machining a workpiece while moving a tool (for example, a drill) in the tool axis direction relative to said workpiece, the cutting is made deep, whereby cutting chips generated by the machining end of said tool can not be effectively removed by air sucking.

It is therefore an object of the invention to provide a cutting chip air-stream removing method and device when machining workpieces in a machine tool, which are able to solve the abovementioned shortcomings in a reasonable manner.

DISCLOSURE OF THE INVENTION

In order to achieve the abovementioned object, a first feature of the invention is constructed so that an enclosing member is provided at the circumference of the chucked end of a tool attached to the rotating axis, a cylindrical member which encloses a tool is slidably inserted into said enclosing member at said tool forward edge thereof, said cylindrical member is formed so that an opening secured at the machining end of said tool is made U-shaped toward the center of said tool, and is pressed toward the machining end of said tool by a spring or the like, wherein a suction pipe which sucks in air from the inside of the cylindrical member is connected to said enclosing member.

According to the feature of the invention, since said suction pipe sucks in air from inside said enclosing member and cylindrical member, the inside of said enclosing member and the like is caused to enter a negative pressure state. Due to this negative pressure and atmospheric air acting on the outside of the forward edge of said cylindrical member, said cylindrical member is sucked in and is caused to move upward along said rotating axis against a force of the spring, and at a specified position, said cylindrical member is balanced with the spring force. When a workpiece is machined, the atmospheric air flow into said enclosing member is limited since the forward edge of said cylindrical member is brought into contact with the surface of said workpiece, whereby the negative pressure inside the enclosing member is made greater. Therefore, since a pressing force due to the atmospheric air acting on the outside of the forward edge of said cylindrical member overcomes the spring force, said enclosing member is further drawn upward along the rotating axis, whereby the limitation of the atmospheric air flow into said enclosing member is broken, and said cylindrical member is retained at a new position with the suction force thereof balanced with the spring force. As the cutting depth of a tool is gradually deepened during machining, the forward edge of said cylindrical member is caused to gradually approach the surface of a workpiece in line with deepening of the cutting. Resultantly, said cylindrical member is caused to move upward along the rotating axis as described above so that said cylindrical member is located at a still new position relative to this approach with the suction force balanced with the spring force. Therefore, the cylindrical member is always maintained at a fixed distance from the surface of a workpiece without any manual operation.

Therefore, even in the case of machining in the spindle direction such as drilling or machining in the direction orthogonal to the spindle such as end milling, the cylindrical member is not brought into contact with workpieces, whereby workpieces are freed from any breakage or damage, and especially in the latter end milling, there is no case where workpieces catch the cylindrical member.

In this feature of the invention, one or more air vent holes are provided inside a tool such as a drill in the axial direction thereof, wherein one end of the air vent hole may be made open at the machining end of said tool, and the other end thereof may be made open to the atmospheric air, by using another member, at the rotating axis side not surrounded by the enclosing member and cylindrical member. Thereby, the negative pressure state in said enclosing member causes the atmospheric air, which is introduced by the air vent hole of a drill, to energetically flow into the enclosing member from the machining end of said tool. The streaming of the atmospheric air through the air vent hole causes cutting chips in a drilling hole to be smoothly sucked in into the enclosing member even in a case where the cutting is deep, and simultaneously the friction heat of said tool is effectively dissipated, whereby the temperature of said tool is prevented from rising, workpieces are prevented from being strained due to the heat of cutting chips, and the machining accuracy is able to be improved.

Still furthermore, according to this feature of the invention, a suction pipe is disposed at the head body portion. On the other hand, a suction channel is formed at the side of said enclosing member which encloses the circumference of the chucked end of a tool in such a manner that one end thereof is caused to communicate with said suction pipe and the other end thereof is caused to communicate with the inside of said enclosing member, wherein it is possible to construct the suction channel integrally with the enclosing member so as to be detachable from the head body.

Next, a second feature of the invention is constructed so that an enclosing member is provided at the circumference of the chucked end of a tool attached to the rotating axis, a cylindrical member which encloses a tool is slidably inserted into said enclosing member at said tool forward edge thereof, said cylindrical member is formed so that an opening secured at the machining end of said tool is made U-shaped toward the center of said tool, is pressed toward the machining end of said tool by a spring or the like, and a suction pipe which sucks in air from the inside of the cylindrical member is connected to said enclosing member while one or more air vent holes are provided in a tool in the tool axial direction, wherein one end thereof is made open at the machining end of said tool, and the other end thereof is connected to a peripheral compressed air supply device.

At this time, a lubricant supplying device may be provided, which is able to mix a mist lubricant with compressed air to be supplied to the air vent hole.

According to the second feature of the invention, compressed air is ejected through an opening of the air vent hole secured at the machining end of said tool while machining is being performed, whereby said tool is caused to be forcedly cooled down, and the wearing and thermal deformation thereof are effectively suppressed, while cutting chips generated by the machining end of said tool are able to be discharged outside by utilizing air streams.

On the other hand, since the suction pipe sucks in air inside the enclosing member and cylindrical member, the pressure inside said enclosing member, etc. is made negative, and the cylindrical member is balanced with a spring force due to this negative pressure and atmospheric air acting on the outer surface of the forward edge (the diagonally circumferential portion) of said cylindrical member.

When machining a workpiece, since the forward edge of the cylindrical member is caused to approach the surface of the workpiece, the flow of the atmospheric air into inside the enclosing member is limited while the tendency that the compressed air ejected from the air vent hole at the machining end of said tool is likely to be sucked in through the suction pipe is intensified, whereby an air stream from the machining end of said tool toward inside the cylindrical member is formed.

At this time, if the quantity of air which is sucked in through the suction pipe is more than that of the compressed air ejected through the air vent hole, the negative pressure inside the enclosing member is further increased. Accordingly, the enclosing member is further drawn upward along the rotating axis (in the direction apart from a workpiece) against a spring force, thereby causing the limitation of the flow of the atmospheric air into the enclosing member to be lightened, and the enclosing member retains a balanced state with the spring force.

As the cutting is gradually made deep during machining, the machining end of said cylindrical member is cased to gradually approach the surface of a workpiece in line therewith, whereby said cylindrical member is caused to move along the rotating axis so as to be balanced at a still new position in compliance with this approach. Therefore, the cylindrical member is always maintained with a fixed distance separated from the surface of a workpiece without any manual operation.

As described above, according to the second feature of the invention, since compressed air is ejected through the machining end of a tool, it is possible to smoothly remove cutting chips outside without fail even in machining at a considerably deep point such as drilling or the like, and the compressed air which passes through the air vent hole effectively cools a tool, whereby the wearing and thermal deformation of said tool are effectively prevented, and the life of said tool and machining accuracy are able to be much increased.

In a case where a lubricant supply device is provided, lubricant mixed in the compressed air by this device is able to comparatively uniformly lubricate the friction part of said tool without inhibiting the stream of the compressed air, thereby causing said tool to be prevented from being worn or thermally deformed.

With this feature of the invention, a suction pipe is disposed at the head body portion. On the other hand, a suction channel is formed at the side of said enclosing member in such a manner that one end thereof is caused to communicate with said suction pipe and the other end thereof is caused to communicate with the inside of said enclosing member, wherein it is possible to construct the suction channel integrally with the enclosing member so as to be detachable from the head body.

Still according to the abovementioned feature of the invention, guide rods may be provided slidably in the tool axial direction at some positions of the circumference of said enclosing member with an adequate interval, whereby the sliding movement of said enclosing member may be guided by these guide rods.

By these guide rods, it is possible to smoothly and stably carry out the sliding movement of said enclosing member by virtue of a supporting action of the guide rods.

PREFERRED EMBODIMENTS OF THE INVENTION

Figure 1:
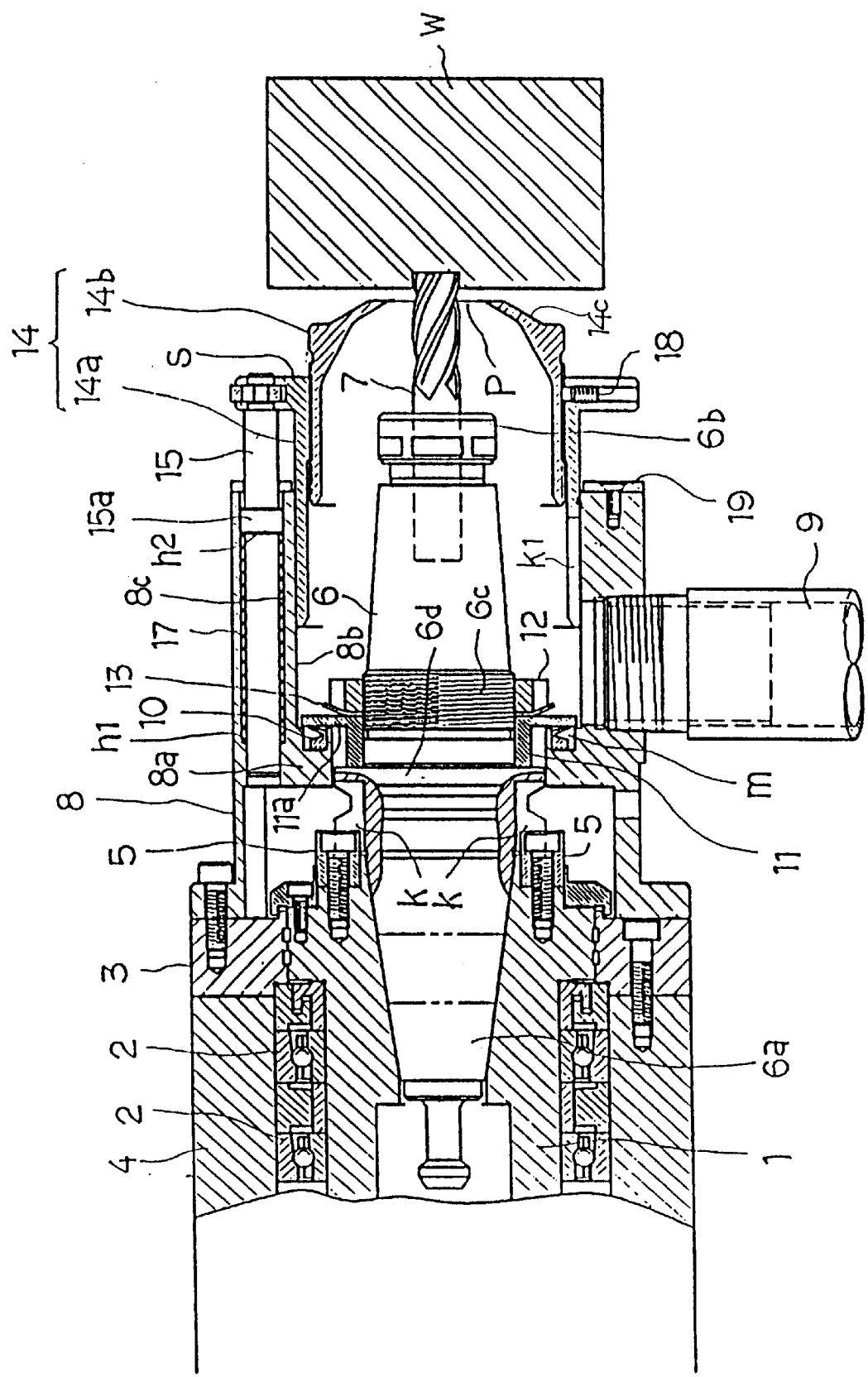
FIG. 1 is a side elevational view showing the spindle head portion of a machine tool according to a first preferred embodiment of a first invention.

Firstly, a first preferred embodiment of the first invention is described with reference to FIG. 1. In the drawing, 1 is a rotating axis which forms a spindle of a machine tool. Said rotating axis is rotatably supported at the spindle head body member 4 via a bearing 2, set ring member 3, and the like.

5 is a key fixed at the spindle 1 with a bolt, 6 is a holder by which shank portion 6a is fitted to and fixed in the spindle 1.

A chuck 6b is provided at the forward edge of the holder 6, and a work tool (end miller) 7 is fixed by the chuck 6.

8 is an enclosing member fixed to the tip surface of a set ring member 3, the appearance of which is roughly cylindrical. The enclosing member 8 is internally provided with a partition wall 8a. A guide opening 8b which is made to enclose the surrounding of the holder 6 is formed at the forward edge of the partition wall 8a, and a guide opening 8c which extends along the axial direction of the holder 6 is provided at the circumferential thick wall of the guide opening 8b in the spindle 1.

A ring groove m in which a seal packing 10 is mounted is provided at the forward end face of the partition wall 8a of said enclosing member 8.

11 is a flange member which is installed at the central portion in the lengthwise direction of the holder 6, and one end thereof is supported at a projection 6d, and the other end thereof is fixed via a washer 13 by a nut 12 screwed to the threaded portion 6c of the holder 6.

The flange member 11, the face 11a in the radial direction thereof being tightly brought into contact with the seal packing 10, is constructed so as to hermetically partition the left and right sections of the partition wall 8a in such a state that rotation of the holder 6 is permitted.

Notches k,k in which said keys 5,5 are fitted and engaged with each other are provided at both ends of the diametrical position of the projection 6d, whereby the spindle 1 is integrally connected with the holder 6 by engagement of the notches k with the keys 5.

14 is a cylindrical member which comprises a body portion 14a slidably inserted into the guide opening 8b and an extending member 14b attached to the tip end of said body member 14a.

The body member 14a has a flange portion s at the forward edge thereof, and a guide rod 15 is fixed at a specified part of said flange portion s along in the axial direction of the holder 6. A swelled sliding portion 15a is formed on the guide rod 15 halfway in the lengthwise direction thereof. Said swelled sliding portion 15a is constructed so as to slide in the guide opening 8c formed at the thick portion of said enclosing member 8, whereby a spring which is in a compressed state is mounted between a staged portion h1 of said guide opening 8c and staged portion h2 of said swelled sliding portion 15a. k1 is also a notch secured at the body member 14a, which is provided so as to cause the internal air to communicate with a suction pipe 9 when the body member 14a is caused to slide and is displaced.

The forward edge of the extending member 14b is formed to be U-shaped toward the center of a tool 7 and is formed so that the more the outer surface 14c goes to the machining end of said tool 7 the more the outer surface 14c of the forward edge thereof approaches the center of said tool 7. Furthermore, the extending member 14b has, at the forward end center thereof, an opening p whose diameter is slightly larger than the cross-section of said tool 7. At this time, the fixed side of the extending member 14c is slidably inserted in the body portion 14a, and simultaneously the extending member 14c is connected by a fixing screw 18 screwed in the flange portion s of the body portion 14a, whereby the extending dimension of the extending member 14b is adjusted by operating said fixing screw 18.

19 is a set ring plate fixed at the forward end face of said enclosing member 8 and functions as a stopper which prevents the guide rod 15 from coming off.

A description is given of a use example of a device constructed according to the invention and actions thereof. No air is sucked in through a suction pipe 9 when an air suction device (not illustrated) is at a pause, whereby a cylindrical member 14 is pushed out to the tip end side of a tool 7 via a guide rod 15 by an elastic force of a spring 7, and the machining end of said tool 7 is in a collapsible state.

Prior to starting the work, as the air suction device is started, air inside the enclosing member 8m is discharged through the suction pipe 9, and on the other hand air is sucked in through the opening p, whereby the inside of the enclosing member 8 is made negative by a streaming resistance of air.

This negative pressure is likely to cause the cylindrical member 14 to be drawn upward along the spindle 1 against a force of the spring 17 in conjunction with the atmospheric air acting on the forward end outer surface 14c of said cylindrical member 14. However, at this moment, the streaming resistance of air is not large, and the cylindrical member 14 is not displaced so much, wherein said tool 7 does not yet protrude outwardly from the opening p of the cylindrical member 14.

Thereafter, as the forward edge of the cylindrical member 14 is caused to approach a workpiece w to be machined, the opening p of said cylindrical member 14 is enclosed by the surface of workpiece w, whereby the flow of air into inside the cylindrical member 14 through the opening p thereof is limited to increase the streaming resistance. Therefore, the negative pressure inside the enclosing member 8 is further increased. On the other hand, since the forward end outer surface 14c of the cylindrical member 14 is made diagonal, the atmospheric air is still acting on the diagonal circumference of the forward end outer surface 14c thereof, whereby the cylindrical member 14 is drawn with a further stronger force against the force of spring 17. Therefore, the cylindrical member 14 is caused to move upward along the spindle 1, and in this state the quantity of air which is caused to flow into the enclosing member 8 through the opening p is increased again. In line therewith, the negative pressure in the enclosing member 8 is lowered and the cylindrical member 14 is returned to the machining end of tool 7, whereby the negative pressure in the enclosing member 8 is increased again. That is, by such actions being repeated, the cylindrical member 14 is maintained at a fixed distance from the workpiece w in a balanced state with the spring 17 force.

Such actions of the cylindrical member 14 are able to be obtained regardless of the degree of the cutting depth of a tool 7 for a workpiece w, whereby the cylindrical member 14 is always retained at a fixed distance from the workpiece during machining. Therefore, it is possible to prevent workpieces from being damaged due to the cylindrical member 14 being brought into contact with the same.

Although cutting chips are generated by a tool 7 during machining a workpiece w, these cutting chips are conveyed into the cylindrical member 14 in succession, riding on streams of air, via between the forward edge of the cylindrical member 14 and the workpiece w and via the opening p. Thereafter, they are discharged to a specified position via the suction pipe 9 along with the air. In a case where said tool 7 is an end miller or the like, said tool 7 moves along the surface of a workpiece while the same is machining a workpiece w. Even in this case, since the cylindrical member 14 is able to be retained at a fixed suction from the workpiece w, the cylindrical member 14 does not damage workpieces nor is caught by any staged part on the surface.

Figure 2:
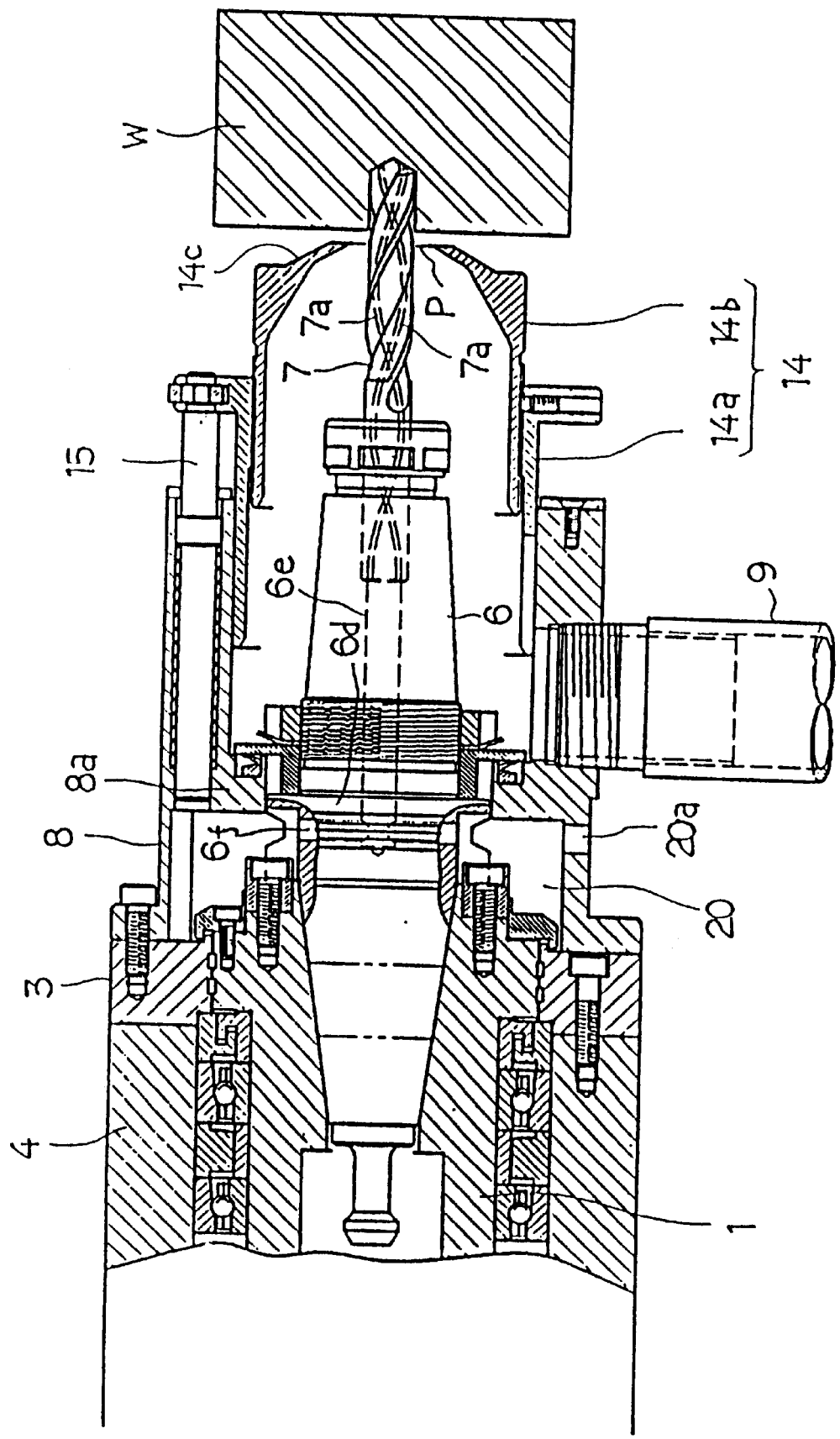
FIG. 2 is a side elevational view showing a modification of the same preferred embodiment.

FIG. 2 is a cross-sectional view showing a modification of the above preferred embodiment. Hereinafter, a description will be given of only the parts which are different from those of the abovementioned preferred embodiment.

A longitudinal channel 6e is provided at the center of the holder 6, and a lateral channel 6f which communicates with said longitudinal channel 6e is located at the diametrical position of the projection 6d while both the ends of said lateral channel 6f are made open to the spindle side space 20 of the partition wall 8a of the enclosing member 8.

A through hole 20a is provided at the circumferential wall of the spindle side space 20 at the enclosing member 8, whereby the space 20 is made open to the atmosphere.

The tool 7 is constructed so as to machine a workpiece comparatively deeply (like a drill), wherein an air vent hole 7a is provided in the axial direction thereof. One end of said air vent hole 7a is made open at the machining end of said tool 7, and the other end thereof is constructed so as to communicate with the longitudinal channel 6e of the holder 6. Furthermore, since the tool 7 shown is a drill, two air vent holes 7a are provided along the spiral grooves thereof.

According to the preferred embodiment, the cylindrical member 14 is able to be always retained at a fixed distance from the workpiece w during machine the same, whereby advantages similar to the above are able to be obtained.

Also in the preferred embodiment, air is caused to flow out through the machining end of said tool 7 via the through hole 20a, lateral channel 6f, longitudinal channel 6e and air vent holes 7a,7a and reaches inside the enclosing member 8 through the spiral grooves of said tool 7. Thereby, even though the cutting depth is deepened by said tool 7, cutting chips generated by the machining end of said tool 7 are smoothly introduced into the enclosing member 8 by streams of air and are thereafter discharged through the suction pipe 9. At this time, the smooth discharge of cutting chips contributes to preventing the heat thereof from being transmitted to workpieces.

The air passing through the air vent holes 7a,7a of said tool 7 effectively takes the friction heat away from the tool 7 in succession, thereby causing the temperature rise thereof to be prevented.

Thus, thermal distortion and/or strain of tool 7 and workpiece w are able to be suppressed, thereby allowing the machining accuracy to be improved.

Figure 3:
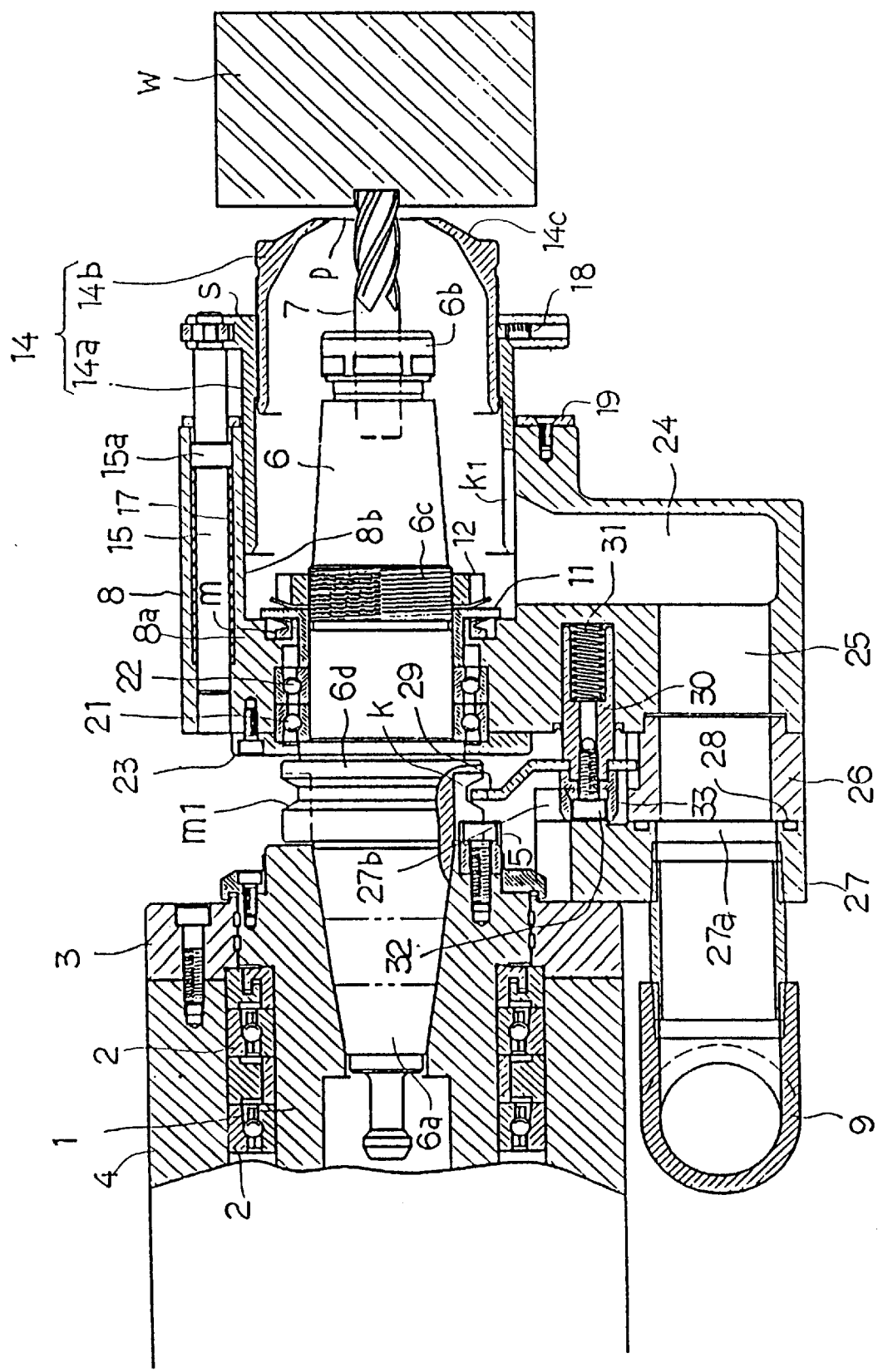
FIG. 3 is a cross-sectional view showing a second preferred embodiment of the invention.

FIG. 3 is a cross-sectional view showing a second preferred embodiment of the invention, wherein the parts substantially identical to those in FIG. 1 and FIG. 2 are given the same reference numbers.

A description will be given of only the parts which are different from those in the preceding preferred embodiments. 21 and 22 are two bearings which are inserted in the diameter-swelled portion of the inner circumference of the partition wall 8a of the enclosing member 8, which rotatably support the holder 6 around the axis. Simultaneously, the end face thereof at the spindle 1 side is fixed at the come-off stopper ring plate 23 fixed by bolts at the end face of the enclosing member 8 at the spindle 1 side.

The left end of the flange portion 11 is supported at the end face of said bearing 22.

A specified portion at the circumferential wall of the enclosing member 8 is swelled out in the horizontal direction orthogonal to the holder 6 axis, wherein a horizontal suction pipe 24 which communicates with the space inside the guide opening 8b in the enclosing member 8 and a longitudinal suction pipe 25 which communicates aid horizontal suction pipe 24.

26 is a ring-shaped member, fixed at the enclosing member 8, which communicates with the end portion of the longitudinal suction pipe 25.

27 is a also a cap plate fixed at the set ring member 3, wherein a through hole 27a is provided at a portion brought into contact with the left end face of said ring-shaped member 26, and simultaneously an O ring 26 is fitted to and inserted in the circumference of said through hole 27a in order to cause said ring-shaped member 26 and said through hole 27a to hermetically communicate with each other. And the suction pipe 9 is connected to the through hole 27a.

The projection 6 forms a gripping portion which is engaged with a tool changing arm of an automatic tool changer (not illustrated) via a groove ml.

29 is an engaging piece which is engaged in a specified part of the projection 6d and determines the rotating position of the holder 6 at a specified position in the spindle 1 direction thereof, and is displaceably supported in the spindle 1 direction via a guide rod 30 slidably inserted in the enclosing member 8, a bolt 32 for fixing said engaging piece 29 at said guide rod 30 and a cap member 33.

27b is a groove into which said cap member 33 is inserted, and which regulates the rotation of the enclosing member 8 around the holder 6 axis.

Furthermore, in this preferred embodiment, the parts which come rightward of the cap plate 27, that is, a tool composition mechanism consisting of the holder 6, enclosing member 8, cylindrical member 14, tool 7, ring-shaped member 26 and engaging piece 29 is grasped and retained by a tool change arm. At this time, the engaging piece 29 positions the holder 6 and withdraws the positioning of the holder 6, whereby the tool composition mechanism is adequately attached to and detached from the spindle 1 in relation to the orientation feature of the spindle 1.

The air in the enclosing member 8 is discharged through the horizontal suction pipe 24, longitudinal suction pipe 25, a ring-shaped member 26, through hole 27a and suction pipe 9.

In such states, cutting chips are able to be removed in compliance with the procedures shown with reference to FIG. 1.

Figure 4:
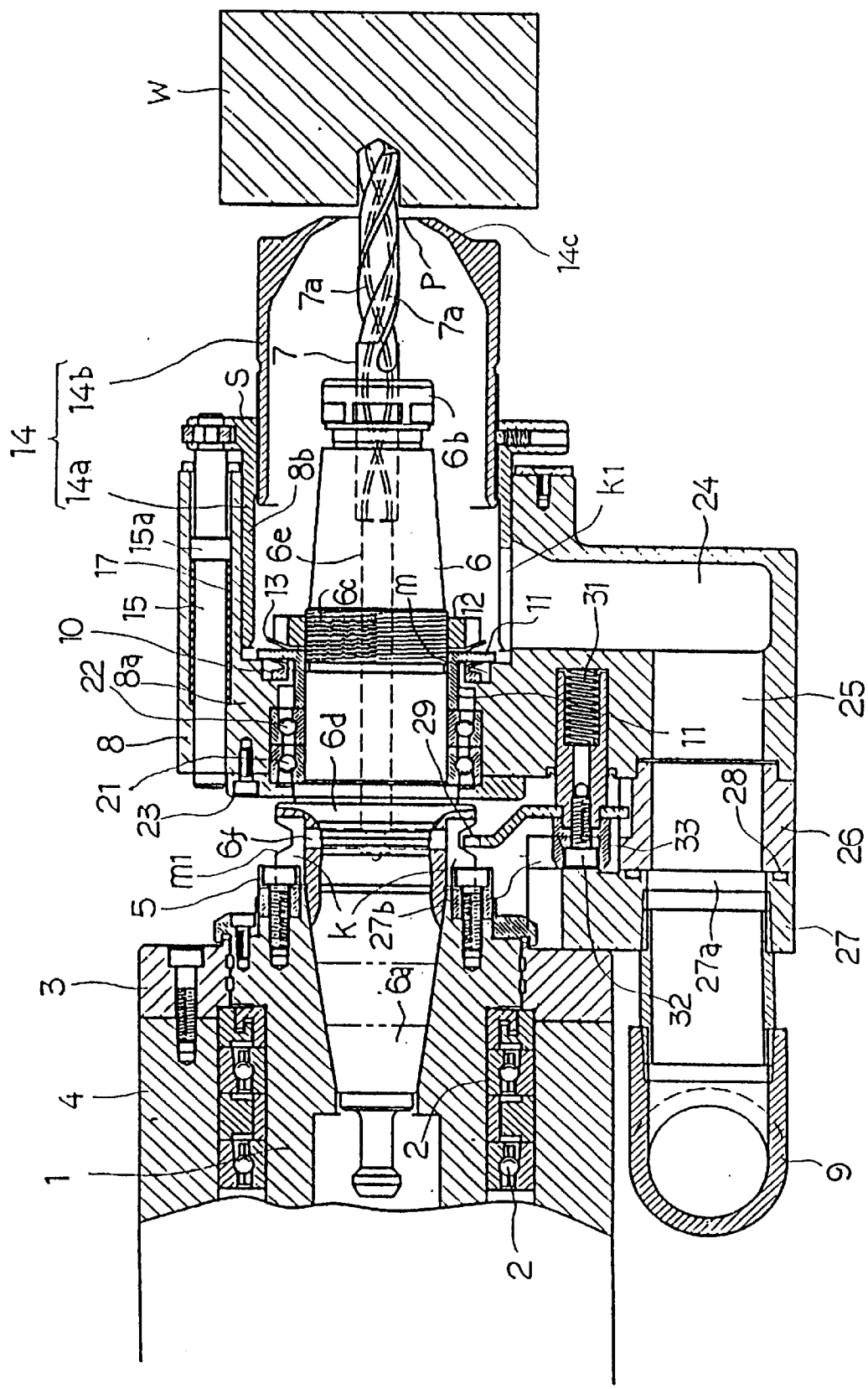
FIG. 4 is a cross-sectional view showing a modification of the same second preferred embodiment.

FIG. 4 is a cross-sectional view showing a modification of the preferred embodiment shown in FIG. 3. In the drawing, the parts substantially identical to those shown in FIG. 1 to FIG. 3 are given the same reference numbers.

A description will be given of only the parts which are different from those of the preferred embodiment shown in FIG. 3. The holder 6 is provided with a longitudinal channel 6e and horizontal channel 6f, and air vent holes 7a,7a are provided in the tool 7 in the axial direction thereof.

According to the device, the actions corresponding to the preferred embodiment shown in FIG. 3 are able to be obtained. In addition thereof, when the enclosing member 8 enters a negative pressure state, air is caused to flow into the enclosing member 8 from the machining end of the tool 7 via the horizontal channel 6f, longitudinal channel 6e and air vent holes 7a,7a as in the preferred embodiment shown in FIG. 2. In connection therewith, the actions similar to those obtained by the abovementioned embodiments are able to be obtained.

Figure 5:
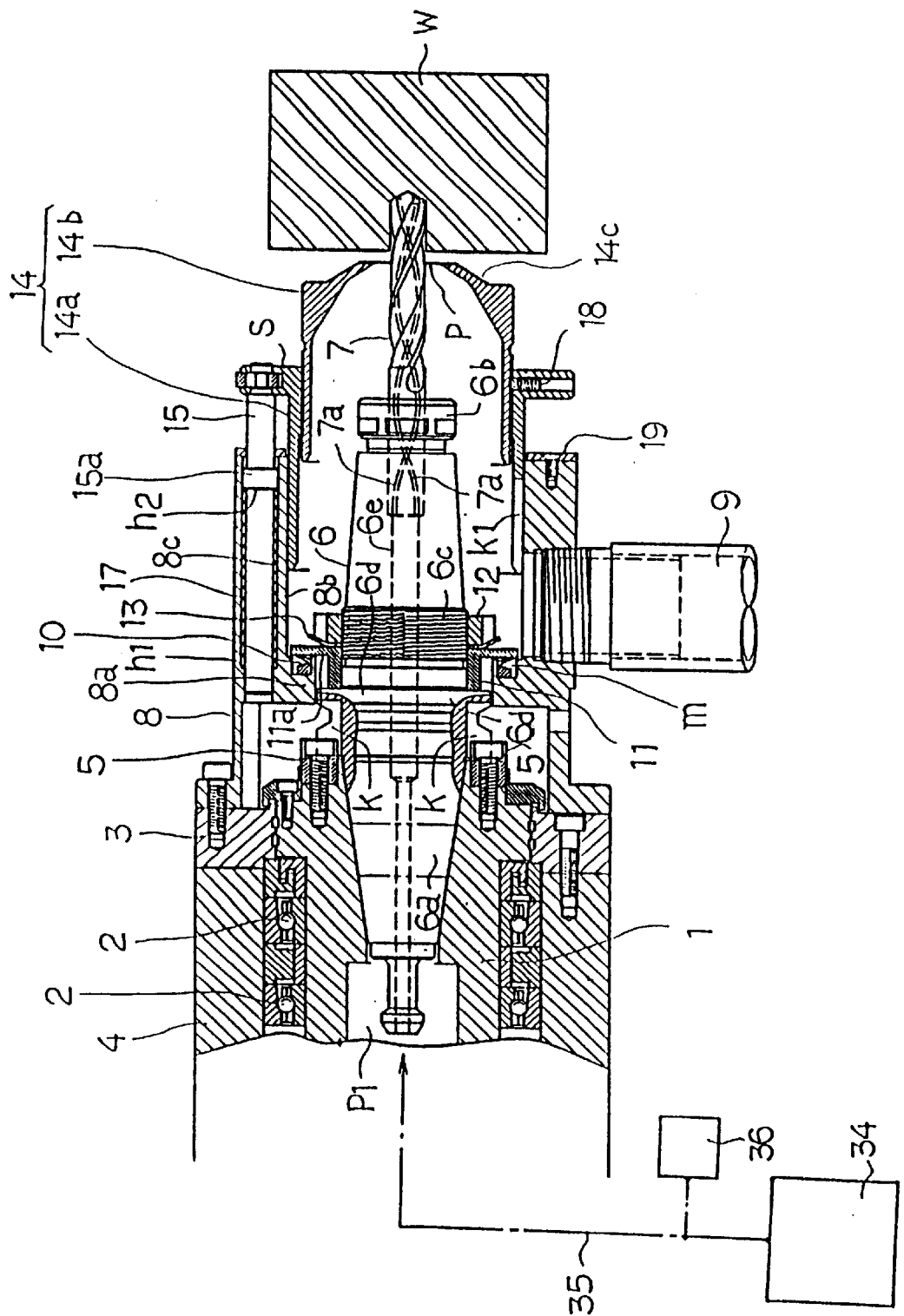
FIG. 5 is a cross-sectional view showing the spindle head portion of a machine tool according to a first preferred embodiment of a second invention.

Next, a description will be given of a second invention. FIG. 5 is a cross-sectional view showing the spindle head of a machine tool according to the first preferred embodiment of the same invention, wherein the parts substantially identical to those referred to in FIG. 1 and FIG. 2 are given the same reference numbers.

A device according to this preferred embodiment is roughly identical to that shown in connection with FIG. 2. Only the parts which are different from those shown in FIG. 2 will be described below. The longitudinal channel 6e of the holder 6 passes through the center bore p1 of the spindle 1 and a rotating joint (not illustrated) and is connected to a compressed air supply pipe 35 extending from a compressed air source 34, wherein a lubricant supplying device 36 which is able to supply and mix a mist lubricant with the compressed air passing through the compressed air supply pipe 35 is provided halfway thereof.

During the machining of a workpiece by a device according to this preferred embodiment, compressed air which is mixed with a mist lubricant is able to reach the air vent hole 7a through the center bore p1 and longitudinal channel 6e and is ejected from the machining end of the tool 7.

Since the ejecting of compressed air is conducted to such a degree that the negative pressure is maintained inside the enclosing member 8, the cylindrical member 14 is always retained at a fixed distance apart from a workpiece w regardless of the degree of the cutting depth by a tool 7 as in the preferred embodiment shown in FIG. 2, whereby the actions similar to those in FIG. 2 are able to be obtained.

Thus, since, while the cylindrical member 14 is operating, the compressed air ejected from the machining end of the tool 7 is sucked into the cylindrical member 14 through a groove(s) of said tool 7, whereby an intensive air stream is formed in a fixed direction, and the air sucked in through the opening p via between the forward edge of the cylindrical member 14 and workpiece w supports this air stream. Therefore, the cutting chips generated by the machining end of tool 7 are conveyed into the enclosing member 8 in succession, riding on this air stream. Thereafter, they are discharged to a specified place via the suction pipe 9 together with this air.

At this time, although cutting chips are generated at a comparative deep point of a workpiece w if the tool 7 is a drill or the like, the compressed air ejected from the air vent hole 7a positively conveys the cutting chips outwardly, thereby smooth and high quality machining will be achieved.

The compressed air passing through the air vent hole 7a during the machining of a workpiece w effectively dissipates the friction heat of a tool 7 in succession, thereby the damage and thermal deformation thereof are effectively prevented from occurring.

Still furthermore, the lubricant contained in the compressed air is able to comparatively uniformly lubricate the entire friction portion of the tool 7 without hindering the flow of the compressed air, thereby the damage and thermal deformation thereof are also effectively prevented from occurring.

Figure 6:
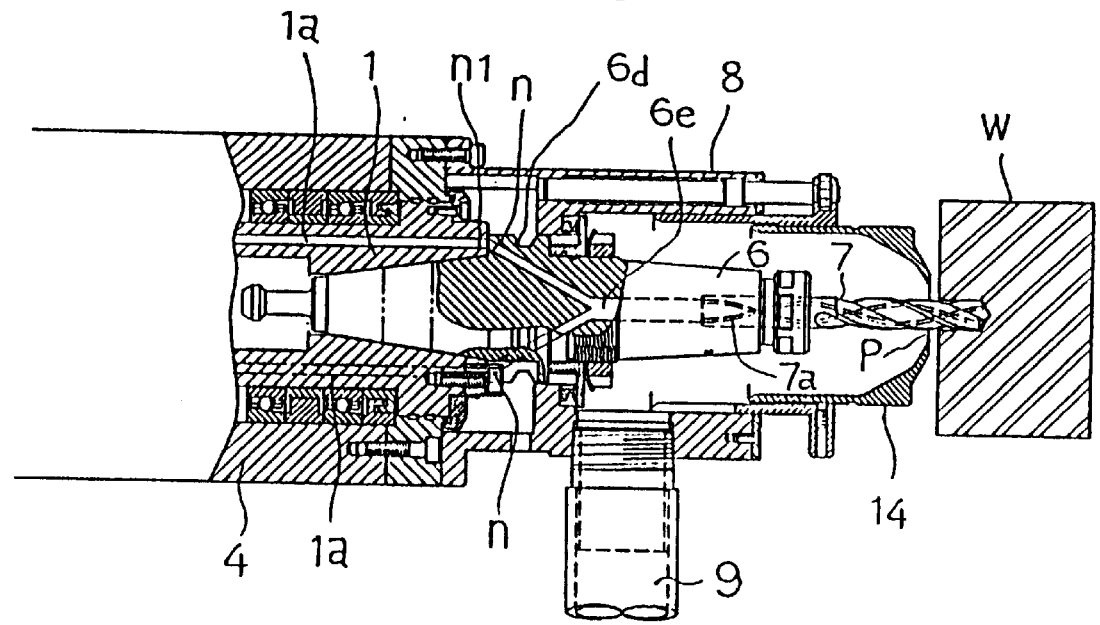
FIG. 6 is a cross-sectional view showing a modification of the same preferred embodiment.

In this preferred embodiment, the connection between the air vent hole 7a and compressed air supply device 35 may be modified as follows;

That is, as shown in FIG. 6, the upper part of the longitudinal channel 6e of the holder is diagonally branched, and the openings n,n thereof are formed at the rear end face of the projection 6d, and on the other hand, channels 1a,1a are formed at the thick portion of the spindle 1, the upper ends of which are connected to the compressed air supply pipe via a rotating joint or the like, whereby the respective openings n,nl are brought into close contact with each other.

Figure 7:
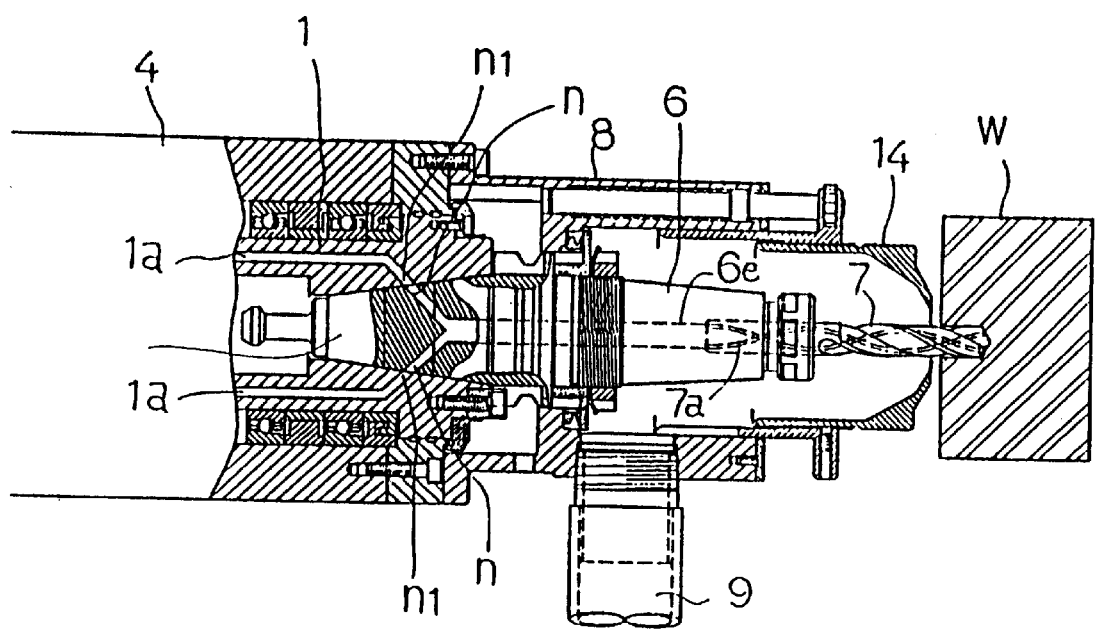
FIG. 7 is a cross-sectional view showing another modification of the same preferred embodiment.

Also, as shown in FIG. 7, the upper portion of the longitudinal channel 6e of the holder 6 is diagonally branched, and the openings n,n thereof are formed at the circumferential side of the shank portion 6a. On the other hand, the lower openings n1 of a channel 1a are installed at the position corresponding to said openings n,n, whereby the respective openings n, nl are brought into close contact with each other.

Figure 8:
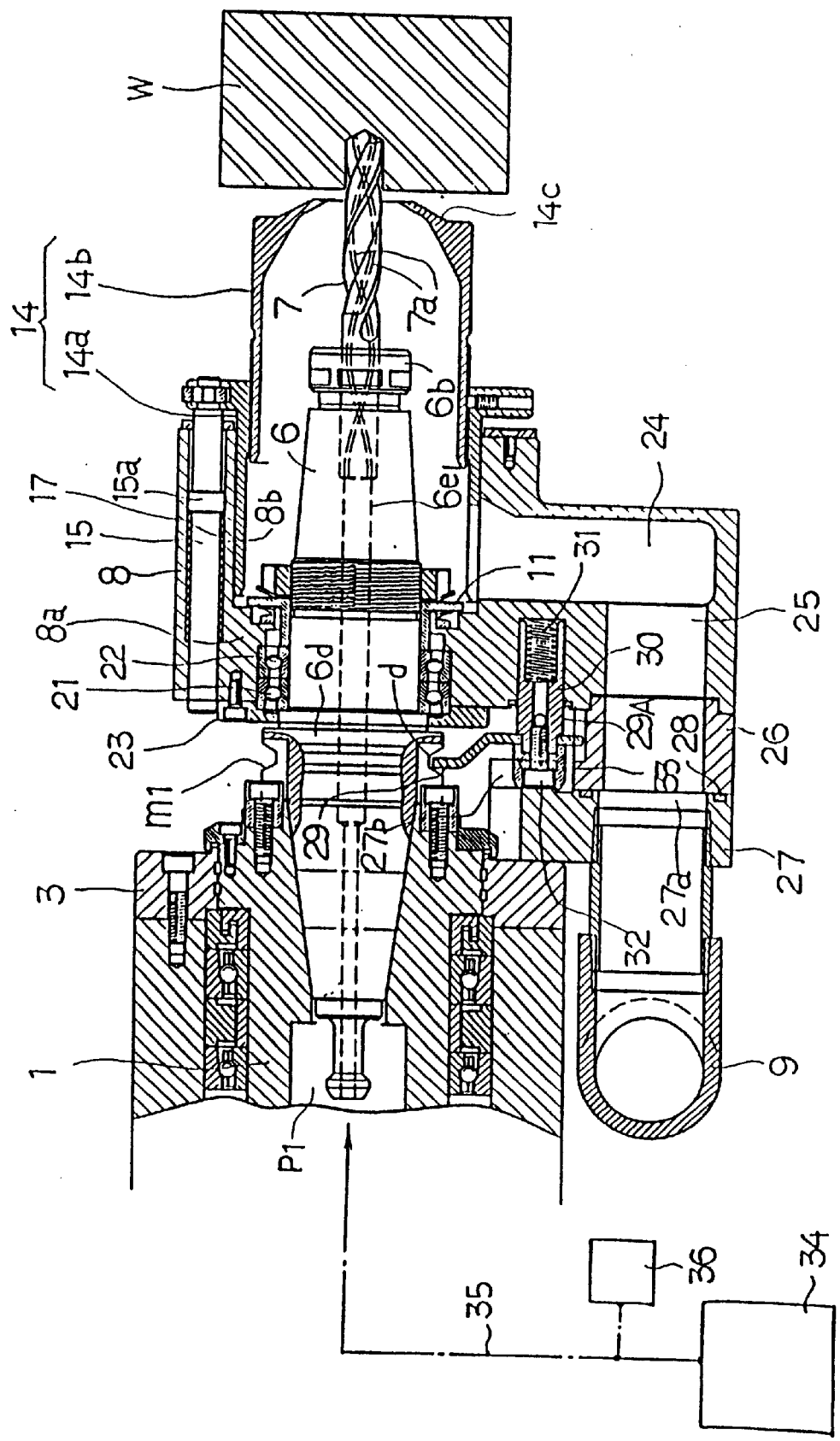
FIG. 8 is a cross-sectional view showing a second preferred embodiment of the invention.

FIG. 8 is a cross-sectional view showing a second preferred embodiment of the second invention, wherein the parts substantially identical to those shown in FIG. ,3 and FIG. 4 are given the same reference numbers.

A device according this preferred embodiment is formed to be roughly identical to that shown in FIG. 4. A description will be given of only the parts which differ from that shown in FIG. 4. The longitudinal channel 6e of the holder 6 passes through the center bore pl of the spindle 1 and a rotating joint (not illustrated), and is connected to the compressed air supply pipe 35 extending from the compressed air supply source 34, wherein a lubricant supplying device 36 which is able to supply and mix a mist lubricant with the compressed air passing through the compressed air supply pipe 35 is provided halfway thereof.

The device is able to operate so that the compressed air to be supplied into the longitudinal channel 6e and mist lubricant to be mixed therewith have the same effects as in the preferred embodiment shown in FIG. 5, and the device operates in compliance with the procedures set forth for the embodiment shown in FIG. 4.

What is claimed is:

1. A cutting chip removing method for machining workpieces in a machine tool, comprising:

providing an enclosing member at the circumference of the chucked end of a work tool attached to a rotating axis of the machine tool, slidably inserting a cylindrical member which encloses the work tool into said enclosing member at a forward edge of said enclosing member , forming said cylindrical member so that an opening secured at the machining end of said work tool is made U-shaped toward the center of said tool, and resiliently biasing said cylindrical member toward the machining end of said tool, causing the inside of said enclosing member to enter a negative pressure state by sucking in air from the inside of the cylindrical member through a suction pipe connected to said enclosing member, and increasing the negative pressure by limiting the air flow from an opening (p) in an extending portion of the cylindrical member when the extending portion is moved near a workpiece and said work tool protrudes from the opening (p) of said extending portion, whereby the negative pressure inside said enclosing member is increased, said cylindrical member is caused to move father into said enclosing member against the resilient biasing, and said cylindrical member is retained at a fixed distance apart from said workpiece in a balanced state with the resilient astir, thereby causing cutting chips to be sucked up and removed.

2. A cutting chip removing device for machining workpieces in a machine tool having a rotating axis, comprising:

an enclosing member (8) provided at the circumference of the chucked end of a work tool attached to the rotating axis, a cylindrical member (14) having a body member (14a) to enclose the work tool and an extending portion (14b) fitted to and slidably received in a forward end of said body member (14a) such that the length of the cylindrical member is adjustable, said body member being slidably received in a forward end of said is enclosing member (8), said cylindrical member having an opening positioned at a machining end of said work tool, being made U-shaped toward the center of said work tool, and being pressed toward the machining end of said work tool by a resilient biasing arrangement, wherein a suction pipe which sucks in air from the inside of the cylindrical member is connected to said enclosing member.

3. A cutting chip removing device for machining workpieces in a machine tool as set forth in claim 2, wherein an air vent hole is provided in the work tool in the axial direction thereof, one end of the air vent hole being open at the machining end of the work tool, and the other end of the air vent hole being open to the atmospheric air at the rotating axis side of the work tool, at a place not surrounded by the enclosing member and the cylindrical member.

4. A cutting chip removing device for machining workpieces in a machine tool having a rotating axis, comprising:

an enclosing member (8) provided at the circumference of the chucked end of a work tool attached to the rotating axis, a cylindrical member (14) a body member (14a) to enclose the work tool and an extending portion (14b) fitted to and slidably received in a forward end of said body member (14a) such that the length of the cylindrical member is adjustable, and said body member is slidably received in a forward end of said enclosing member (8), said cylindrical member having an opening positioned at a machining end of said work tool being made U-shaped toward the center of said tool, and being pressed toward the machining end of said work tool by a resilient biasing arrangement, wherein a suction pipe which sucks in air from the inside of the cylindrical member is connected to said enclosing member, and an air vent hole is provided in the work tool in the axial direction thereof, with one end of the air vent hole being open at the machining end of the work tool and the other end of the air vent hole being connected to a source of compressed air.

5. A cutting chip removing device for machining workpieces in a machine tool as set forth in claim 2, wherein said guide rods (15) are slidably provided in the tool axis direction at intervals in the circumferential direction of said enclosing member (8), said guide rods guiding the advancement and retraction of said cylindrical member (14).

6. A cutting chip removing device for machining workpieces in a machine tool as set forth in claim 4, further comprising a lubricant supply device mixing mist lubricant be compressed air to be supplied to said air vent hole.

7. A cutting chip removing device for machining workpieces in a machine tool as set forth in claim 2, wherein the rotating axis is rotatably mounted in a head body at one side of the enclosing member, the suction pipe is disposed at the head body side of the enclosing member, a suction channel, one end of which communicates with said suction pipe and the other end of which communicates with the inside of the cylindrical member, is provided in said enclosing member, and said suction channel is attachable to and detachable from the head body integrally with said enclosing member.

8. A cutting chip removing device for machining workpieces in a machine tool as set forth in claim 3, wherein guide rods (15) are slidably provided in the tool axis direction at intervals in the circumferential direction of said enclosing member (8), said guide rods guiding the advancement and retraction of said cylindrical member (14).

9. A cutting chip removing device for machining workpieces in a machine tool as set forth in claim 4, wherein guide rods (15) are slidably provided in the tool axis direction at intervals in the circumferential direction of said enclosing member (8), said guide rails guiding the advancement and retraction of said cylindrical member (14).

10. A cutting chip removing device for machining workpieces in a machine tool as set forth in claim 5, further comprising a lubricant supply device mixing mist lubricant with compressed air to be supplied to said air vent hole.

11. A cutting chip removing device for machining workpieces in a machine tool as set forth in claim 8, further comprising a lubricant supply device mixing mist lubricant with compressed air to be supplied to said air vent hole.

12. A cutting chip removing device for machining workpieces in a machine tool as set forth in claim 9, further comprising a lubricant supply device mixing mist lubricant with compressed air to be supplied to said air vent hole.

13. A cutting chip removing device for machining workpieces in a machine tool as set forth in claim 3, wherein the rotating axis is rotatably mounted in a head body at one side of the enclosing member, the suction pipe is disposed at the head body side of the enclosing member, a suction channel, one end of which communicates with said suction pipe and the other end of which communicates with the inside of the cylindrical member, is provided in said enclosing member, and said suction channel is attachable to and detachable from the head body integrally with said enclosing member.

14. A cutting chip removing device for machining workpieces in a machine tool as set forth in claim 4, wherein the rotating axis is rotatably mounted in a head body at one side of the enclosing member, the suction pipe is disposed at the head body side of the enclosing member, a suction channel, one end of which communicates with said suction pipe and the other end of which communicates with the inside of the cylindrical member, is provided in said enclosing member, and said suction channel is attachable to and detachable from the head body integrally with said enclosing member.

15. A cutting chip removing device for machining workpieces in a machine tool as set forth in claim 5, wherein the rotating axis is rotatably mounted in a head body a one side of the enclosing member, the suction pipe is disposed at the head body side of the enclosing member, a suction channel, one end of which communicates with said suction pipe and the other end of which communicates with the inside of the cylindrical member, is provided in said enclosing member, and said suction channel is attachable to and detachable from the head body integrally with said enclosing member.

16. A cutting chip removing device for machining workpieces in a machine tool as set forth in claim 6, wherein the rotating axis is rotatably mounted in a head body at one side of the enclosing member, the suction pipe is disposed at the head body side of the enclosing member, a suction channel, one end of which communicates with said suction pipe and the other end of which communicates with the inside of the cylindrical member, is provided in said enclosing member, and said suction channel is attachable to and detachable from the head body integrally with said enclosing member.

* * * * *